US011260476B2

(12) United States Patent
Ide et al.

(10) Patent No.: US 11,260,476 B2
(45) Date of Patent: Mar. 1, 2022

(54) ALUMINUM ALLOY BRAZING SHEET AND METHOD FOR MANUFACTURING THE SAME

(71) Applicant: UACJ Corporation, Tokyo (JP)

(72) Inventors: Tatsuya Ide, Tokyo (JP); Tomohiro Shoji, Tokyo (JP); Dai Yamamoto, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 259 days.

(21) Appl. No.: 16/467,277

(22) PCT Filed: Dec. 1, 2017

(86) PCT No.: PCT/JP2017/043267
§ 371 (c)(1),
(2) Date: Jun. 6, 2019

(87) PCT Pub. No.: WO2018/110320
PCT Pub. Date: Jun. 21, 2018

(65) Prior Publication Data
US 2020/0070286 A1 Mar. 5, 2020

(30) Foreign Application Priority Data

Dec. 14, 2016 (JP) .............................. JP2016-241772

(51) Int. Cl.
*B32B 15/01* (2006.01)
*B23K 35/02* (2006.01)
(Continued)

(52) U.S. Cl.
CPC ........ *B23K 35/0238* (2013.01); *B32B 15/016* (2013.01); *C22C 21/12* (2013.01); *C22F 1/057* (2013.01); *Y10T 428/12764* (2015.01)

(58) Field of Classification Search
None
See application file for complete search history.

(56) References Cited

U.S. PATENT DOCUMENTS 10,688,601 B2 * 6/2020 Asano ................ C22F 1/047
2018/0111232 A1 * 4/2018 Shibuya ............... C22C 21/12
2018/0193960 A1 7/2018 Asano et al.

FOREIGN PATENT DOCUMENTS

EP 3321385 A1 5/2018
JP 11-80871 A 3/1999
(Continued)

OTHER PUBLICATIONS

Office Action dated Jul. 3, 2020, issued in counterpart CN application No. 201780077268.7, with English translation. (12 pages).
(Continued)

*Primary Examiner* — Daniel J. Schleis
(74) *Attorney, Agent, or Firm* — Westerman, Hattori, Daniels & Adrian, LLP

(57) ABSTRACT

An aluminum alloy includes: a core material made of an aluminum alloy including Si, Cu, and Mn, with the balance being Al and unavoidable impurities; a brazing material cladded onto one side surface of the core material, and made of an aluminum alloy including Si, with the balance being Al and unavoidable impurities; and a sacrificial anode material cladded onto the other side surface of the core material, and made of an aluminum alloy including Zn and Si, with the balance being Al and unavoidable impurities, wherein a total number density of single phase pure Si and a intermetallic compound existing in the sacrificial anode material and having a grain size of 0.1 μm or more and 1.0 μm or less is $1\times10^3/mm^2$ or more and $1\times10^6/mm^2$ or less.

7 Claims, 1 Drawing Sheet

(51) Int. Cl.
C22C 21/12 (2006.01)
C22F 1/057 (2006.01)

(56) References Cited

FOREIGN PATENT DOCUMENTS

| | | | |
|---|---|---|---|
| JP | 2008-261026 A | | 10/2008 |
| JP | 2009-30123 A | | 2/2009 |
| JP | 5388084 | * | 1/2014 |
| JP | 2016-3356 A | | 1/2016 |
| JP | 2016-172897 A | | 9/2016 |
| WO | 2015/162911 A1 | | 10/2015 |

OTHER PUBLICATIONS

International Search Report dated Feb. 20, 2018, issued in counterpart International Application No. PCT/JP2017/043267 (1 page).
Extended (Supplementary)European Search Report dated Apr. 2, 2020, issued in counterpart EP Application No. 17881212.9. (8 pages).

* cited by examiner

ALUMINUM ALLOY BRAZING SHEET AND METHOD FOR MANUFACTURING THE SAME

TECHNICAL FIELD

The present invention relates to an aluminum alloy clad material used as a constituent member for heat exchangers of automobiles or the like, and a method for manufacturing the same.

BACKGROUND ART

Aluminum alloy is lightweight and has high heat conductivity, and used for heat exchangers for automobiles, such as radiators, condensers, evaporators, heater cores, and intercoolers. As an example of heat exchangers, FIG. 2 illustrates a schematic diagram of a radiator. The radiator has a structure in which thin fins 2 processed in a corrugated shape are arranged between a plurality of tubes 1 formed in a flat shape. The tubes 1 and the fins 2 are formed as one unitary piece. Both ends of the tubes 1 are opened to spaces each formed of a header 3 and a tank 4. In the heat exchanger, a high-temperature coolant is sent from a space of one tank to a space of the other tank through the tubes 1, and the coolant with a temperature reduced to a low temperature by heat exchange with the tubes 1 and the fins 2 is circulated.

A brazing sheet is generally used for tubes of such heat exchangers. The brazing sheet includes a core material, an inner lining material, and a brazing material. As the core material, for example, JIS 3003 (Al-0.15 mass % Cu-1.1 mass % Mn) alloy is used. On the internal side of the core material, that is, on the side always contacting the coolant, for example, JIS 7072 (Al-1 mass % Zn) alloy is used as the lining material. On the external side of the core material, for example, JIS 4045 (Al-10 mass % Si) alloy is used as the brazing material. The tubes are bonded together with other materials, such as fins processed in a corrugated shape, as one unitary piece by brazing.

A flux brazing method and a Nocolok brazing using a non-corrosive flux are mentioned as examples of the brazing method. Brazing is performed by heating each of the members to a temperature around 600° C.

As described above, when an Al—Zn based alloy is disposed on the cooling water (coolant) side, Zn added to the sacrificial anode material is diffused into the core material in brazing, to form a Zn-diffused layer. It is known that corrosion occurring in the sacrificial anode material advances to laterally spread by virtue of existence of the Zn-diffused layer, and prevents penetration corrosion for a long period of time.

In addition, because there are cases where automobiles travel under a severe environment in which corrosion promoting droplets including a road anti-freezing agent and the like may adhere to the automobiles, tubes of heat exchangers for automobiles are also required to improve in corrosion resistance of the external surface.

Besides, in recent years, there are increasing demands for reduction in weight of automobiles. With such demands, it has been discussed to reduce the weight of heat exchangers for automobiles, and reduce the thickness of each of members forming the heat exchangers. To reduce the thickness of the members, there are increasing demands for materials more excellent in strength after brazing and corrosion resistance than conventional materials.

Neutral to weak-alkaline aqueous solutions (long life coolant: LLC) including an antifreeze are used as cooling water for radiators and/or heater cores. Some types of such aqueous solutions have a pH of 10 or around. In tubes using an Al—Zn based alloy for the sacrificial anode material, there is the problem that no sufficient effect of preventing corrosion of the sacrificial material is obtained in such environments, and that penetration corrosion occurs early.

For this reason, as an aluminum alloy clad material for heat exchangers excellent in corrosion resistance, for example, Patent Literature 1 discloses an aluminum alloy clad material for heat exchangers excellent in corrosion resistance, in which an aluminum alloy brazing material is cladded onto one side surface of a core material made of an aluminum alloy, and a sacrificial anode material is cladded onto the other side surface of the core material, wherein the sacrificial anode material is formed of an aluminum alloy including an element to be coupled with Al to generate a compound nobler than the matrix of the sacrificial anode material, with the balance being Al and impurities, and the compound with a grain size (diameter corresponding to a circle, the same is applicable hereinafter) of 1 μm to 10 μm exists in number of $5 \times 10^2$ to $5 \times 10^4$ per 1 $mm^2$ in the matrix. The aluminum alloy clad material for heat exchangers disclosed in Cited Document 1 is provided such that a compound with a grain size of 1 μm to 10 μm obtained by combination of an element with Al and nobler than the matrix of the sacrificial anode material exists at a certain density in the sacrificial anode material.

PRIOR ART LITERATURES

Patent Literature

Patent Literature 1: Japanese Patent Publication No. H11-80871-A

SUMMARY OF INVENTION

Problem to be Solved by Invention

Inside the radiator, because the coolant for cooling the engine is circulated by pumping with a pump, the inside of the radiator has a high pressure with the coolant when the pump operates, the tubes receive a force in a direction in which the sectional shape thereof expands, the header plate receives a force in a direction in which the caulking joint portion with the resin tank joined by caulking with the header plate is opened, and tensile stress acts on the sacrificial anode material. When such a state is repeated for a long period of time, the tubes and/or the header plate may cause a fatigue fracture, and cause a problem in life and reliability.

However, the sacrificial anode material as disclosed in Cited Document 1 has insufficient fatigue property, and has the problem of an early fatigue fracture.

Specifically, in conventional art, difficulty exists in providing a material having sufficient corrosion resistance and excellent fatigue property, also with a small thickness, under an environment in which alkaline cooling water is circulated by pumping with a pump.

Accordingly, an object of the present invention is to provide an aluminum alloy brazing sheet having excellent corrosion resistance and fatigue property even in heat exchangers in which cooling water flows in an alkali corrosive environment, and suitable for radiators and/or heater cores of heat exchangers for automobiles.

Means for Solving the Problem

To solve the problem described above, as a result of repeated diligent researches, the inventors of the present invention have found that excellent corrosion resistance and fatigue property can be provided to the aluminum alloy brazing sheet, by adopting specific Chemical composition for the constituent material of the aluminum alloy brazing sheet, and dispersing single phase pure Si grains or grains of a Si-including intermetallic compound of a predetermined size in a predetermined number density in the sacrificial anode material, and have made the present invention.

Specifically, Present Invention (1) is an aluminum alloy brazing sheet comprising: a core material made of an aluminum alloy including 0.3 mass % to 1.2 mass % of Si, 0.1 mass % to 1.5 mass % of Cu, and 0.3 mass % to 2.0 mass % of Mn, with the balance being Al and unavoidable impurities; a brazing material cladded onto one side surface of the core material, and made of an aluminum alloy including 4.0 to 13 mass % of Si, with the balance being Al and unavoidable impurities; and a sacrificial anode material cladded onto the other side surface of the core material, and made of an aluminum alloy including 1.0 mass % to 8.0 mass % Zn and 0.5 mass % to 1.5 mass % of Si, with the balance being Al and unavoidable impurities, wherein
a total number density of Si and a Si-including intermetallic compound existing in the sacrificial anode material and having a grain size of 0.1 µm or more and 1.0 µm or less is $1 \times 10^3/\text{mm}^2$ or more to $1 \times 10^6/\text{mm}^2$ or less.

Present Invention (2) provides the aluminum alloy brazing sheet according to (1), wherein the brazing material further includes 0.3 mass % to 5.0 mass % of Zn.

Present invention (3) provides the aluminum alloy brazing sheet according to (1) or (2), wherein the core material further includes at least one or more of 0.01 mass % to 0.3 mass % of Cr, 0.01 mass % to 0.3 mass % of Zr, 0.01 mass % to 0.3 mass % of Ti, and 0.01 mass % to 0.3 mass % of V.

Present invention (4) provides the aluminum alloy brazing sheet according to any one of (1) to (3), wherein the core material further includes one or two of 0.05 mass % to 1.0 mass % of Fe and 0.1 mass % to 1.0 mass % of Mg.

Present Invention (5) provides the aluminum alloy brazing sheet according to any one of (1) to (4), wherein the sacrificial anode material further includes at least one or more of 0.01 mass % to 0.3 mass % of Cr, 0.01 mass % to 0.3 mass % of Zr, 0.01 mass % to 0.3 mass % or Ti, and 0.01 mass % to 0.3 mass % of V.

Present Invention (6) provides the aluminum alloy brazing sheet according to any one of (1) to (5), wherein the sacrificial anode material further includes one or two of 0.05 mass % to 0.5 mass % of Fe and 0.1 mass % to 2.5 mass % of Mg.

Present Invention (7) provides a method for manufacturing the aluminum alloy brazing sheet according to any one of (1) to (6), comprising: manufacturing an aluminum alloy for a sacrificial anode material before being assembled as a clad material, wherein, in the manufacturing, a hot rolling temperature is set to 400° C. to 500° C., and reduction of hot rolling is set to 50% to 90%.

Effects of Invention

The present invention enables provision of an aluminum alloy brazing sheet having excellent corrosion resistance and fatigue property even in heat exchangers in which cooling water flows in an alkali corrosive environment, and suitable for radiators and/or heater cores of heat exchangers for automobiles.

EMBODIMENTS

The present invention is an aluminum alloy brazing sheet comprising: a core material made of an aluminum alloy including 0.3 mass % to 1.2 mass % of Si, 0.1 mass % to 1.5 mass % of Cu, and 0.3 mass % to 2.0 mass % of Mn, with the balance being Al and unavoidable impurities; a brazing material cladded onto one side surface of the core material, and made of an aluminum alloy including 4.0 mass % to 13 mass % of Si, with the balance being Al and unavoidable impurities; and a sacrificial anode material cladded onto the other side surface of the core material, and made of an aluminum alloy including 1.0 mass % to 8.0 mass % of Zn and 0.5 mass % to 1.5 mass % of Si, with the balance being Al and unavoidable impurities, wherein a total number density of single phase pure Si and a Si-including intermetallic compound existing in the sacrificial anode material and having a grain size of 0.1 µm or more and 1.0 µm or less is $1 \times 10^3/\text{mm}^2$ or more and $1 \times 10^6/\text{mm}^2$ or less.

Figure 1:
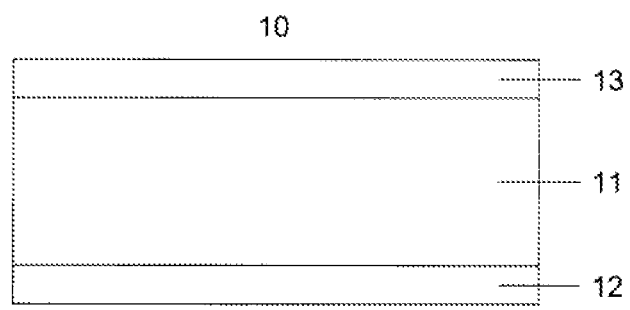
FIG. 1 is a schematic sectional view of an aluminum alloy brazing sheet according to the present invention.
Figure 2:
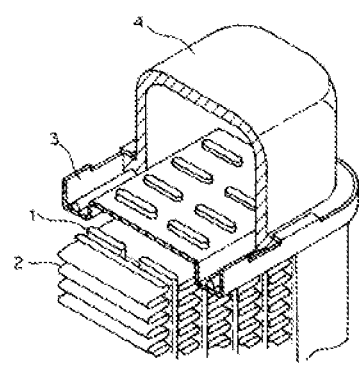
FIG. 2 is a schematic diagram of a radiator.

FIG. 1 illustrates an example of a form of an aluminum alloy brazing sheet according to the present invention. In FIG. 1, an aluminum alloy brazing sheet 10 is formed of a core material 11, a brazing material 12, and a sacrificial anode material 13. The brazing material 12 is cladded onto one side surface of the core material 11, and the sacrificial anode material 13 is cladded onto the other side surface of the core material 11. That is, the aluminum alloy brazing sheet according to the present invention includes a core material, a brazing material cladded onto one side surface of the core material, and a sacrificial anode material cladded onto the other side surface of the core material.

The sacrificial anode material according to the aluminum alloy brazing sheet of the present invention, that is, the sacrificial anode material cladded onto the core material in the aluminum alloy brazing sheet of the present invention is made of an aluminum alloy, and includes Zn and Si as indispensable compositions.

The sacrificial anode material is made of an aluminum alloy including 1.0 mass % to 8.0 mass % of Zn and 0.5 mass % to 1.5 mass % of Si, with the balance being Al and unavoidable impurities.

Zn in the sacrificial anode material changes the potential of the sacrificial anode material to a lower potential to maintain the sacrificial anode effect for the core material and prevent pitting corrosion and/or crevice corrosion of the core material. The Zn content in the sacrificial anode material is 1.0 mass % to 8.0 mass %, and preferably 4.0 mass % to 7.0 mass %. When the Zn content in the sacrificial anode material is lower than the range described above, Zn produces no sufficient effect. When the Zn content exceeds the range described above, the corrosion speed becomes too high, the sacrificial anode material disappears early, and corrosion resistance is reduced.

In the sacrificial anode material, Si exists as single phase pure Si, or exists together with an element, such as Fe, Mg, and Mn, to form an Al—Fe—Si based, Al—Fe—Si—Mn based, Al—Mn—Si based, or Mg—Si based intermetallic compound including Si. In the sacrificial anode material, progress of cathode reaction is promoted on the surface of single phase pure Si or the Si-including intermetallic compound. For this reason, pitting corrosion is scattered, and localization of pitting corrosion is suppressed. As a result, progress of pitting corrosion in the depth direction is suppressed, and the life until corrosion penetration is prolonged. The Si content in the sacrificial anode material is 0.5 mass % to 1.5 mass %, and preferably 0.7 mass % to 1.3 mass %. When the Si content in the sacrificial anode material is lower than the range described above, the total number density of single phase pure Si and the Si-including intermetallic compound does not fall within the range of $1\times10^3/mm^2$ or more $1\times10^6/mm^2$ or less, the effect described above is not sufficiently obtained. When the Si content exceeds the range described above, the solidus temperature of the sacrificial anode material becomes too low, and the sacrificial anode material is molten.

In addition to Zn and Si, the sacrificial anode material may include at least one or more of 0.01 mass % to 0.3 mass % of Cr, 0.01 mass % to 0.3 mass % of Zr, 0.01 mass % to 0.3 mass % of Ti, and 0.01 mass % to 0.3 mass % of V. Each of Cr, Zr, Ti, and V forms a fine intermetallic compound in the sacrificial anode material, and improves the strength of the material. When the content of Cr, Zr, Ti, or V in the sacrificial anode material is lower than the range described above, the effect described above is not sufficiently obtained. When the content exceeds the range described above, a coarse compound is generated in casting to damage rolling processability, and a sound sheet material is not easily acquired. The Cr content in the sacrificial anode material is preferably 0.05 mass % to 0.2 mass %, the Zr content is preferably 0.05 mass % to 0.2 mass %, the Ti content is preferably 0.05 mass % to 0.2 mass %, and the V content is preferably 0.05 mass % to 0.2 mass %.

In addition to Zn and Si, the sacrificial anode material may include one or two of 0.05 mass % to 0.5 mass % of Fe and 0.1 mass % to 2.5 mass % of Mg. Each of Fe and Mg forms an Al—Fe—Si based, Al—Fe—Si based, or Mg—Si based intermetallic compound together with Si in the sacrificial anode material. In the sacrificial anode material, progress of cathode reaction is promoted on the surface of the intermetallic compound. For this reason, pitting corrosion is scattered, and localization of pitting corrosion is suppressed. As a result, progress of pitting corrosion in the depth direction is suppressed, and the life until corrosion penetration is prolonged. The Fe content in the sacrificial anode material is 0.05 mass % to 0.5 mass %, and preferably 0.1 mass % to 0.3 mass %. When the Fe content in the sacrificial anode material is lower than the range described above, the effect described above is not sufficiently obtained. When the Fe content exceeds the range described above, self corrosion resistance decreases, and the sacrificial anode material is worn early. As a result, the sacrificial anti-corrosion effect cannot be obtained, and penetration occurs early. The Mg content in the sacrificial anode material is 0.1 mass % to 2.5 mass %, and preferably 0.2 mass % to 2.0 mass %. When the Mg content in the sacrificial anode material is lower than the range described above, the effect described above is not sufficiently obtained. When the Mg content exceeds the range described above, self corrosion resistance decreases, and the sacrificial anode material is worn early. As a result, the sacrificial anti-corrosion effect cannot be obtained, and penetration occurs early.

The core material according to the aluminum alloy brazing sheet according to the present invention is made of an aluminum alloy, and includes Si, Cu, and Mn as indispensable compositions.

The core material is made of an aluminum alloy including 0.3 mass % to 1.2 mass % of Si, 0.1 mass % to 1.5 mass % of Cu, and 0.3 mass % to 2.0 mass % of Mn, with the balance being Al and unavoidable impurities.

Cu in the core material increases strength of the core material, and causes the potential of the core material to be noble to increase the potential difference from the sacrificial anode material and the potential difference from the brazing material and improve corrosion resistance. In addition, Cu in the core material is diffused into the sacrificial anode material and the brazing material in brazing heating to form a gentle Cu concentration gradient. As a result, the potential on the core material side becomes noble and the potential on the sacrificial anode material surface side or the brazing material surface side becomes lowered, and gentle potential distribution is formed in the thickness direction of the sacrificial anode material or the brazing material to cause their corrosion forms to be a whole surface corrosion type. The Cu content in the core material is preferably 0.1 mass % to 1.5 mass %, and particularly preferably 0.5 mass % to 1.3 mass %. When the Cu content in the core material is lower than the range described above, the effect thereof is small. When the Cu content exceeds the range described above, corrosion resistance of the core material decreases, the melting point of the core material decreases, and local melting occurs in brazing heating.

Mn in the core material increases strength of the core material, and causes the potential of the core material to be noble to increase the potential difference from the sacrificial anode material and the potential difference from the brazing material and improve corrosion resistance. Mn also changes the potential in the core material to be noble, and functions to increase the difference in potential from the sacrificial anode material and improve corrosion resistance. The Mn content in the core material is preferably 0.3 mass % to 2.0 mass %, and particularly preferably 1.0 mass % to 1.9 mass %. When the Mn content in the core material is lower than the range described above, the effect thereof is small. When the Mn content exceeds the range described above, a coarse compound is generated in casting to damage rolling processability, and consequently a sound sheet material is not easily obtained.

Si in the core material has a function of improving strength of the core material by solute strengthening and fine precipitation hardening of Al—Mn—Si based or Mg—Si based intermetallic compound. The Si content in the core material is preferably 0.3 mass % to 1.2 mass %, and particularly preferably 0.4 mass % to 1.0 mass %. When the Si content in the core material is lower than the range described above, the effect thereof is not sufficient. When the Si content exceeds the range described above, corrosion resistance decreases, the melting point of the core material decreases, and local melting easily occurs in brazing.

The core material may further include at least one or more of 0.01 mass % to 0.3 mass % of Cr, 0.01 mass % to 0.3 mass % of Zr, 0.01 mass % to 0.3 mass % of Ti, and 0.01 mass % to 0.3 mass % of V. Each of Cr, Zr, Ti, and V forms a fine intermetallic compound in the core material to improve strength of the material. When the content of Cr, Zr, Ti, or V in the core material is lower than the range described above, the effect thereof is not sufficient. When the content exceeds the range described above, a coarse compound is generated in casting to damage rolling processability, and consequently a sound sheet material is not easily obtained. The Cr content in the core material is preferably 0.05 mass % to 0.2 mass %, the Zr content is preferably 0.05 mass % to 0.2 mass %, the Ti content is preferably 0.05 mass % to 0.2 mass %, and the V content is preferably 0.05 mass % to 0.2 mass %.

The core material may further include one or two of 0.05 mass % to 1.0 mass % of Fe and 0.1 mass % to 1.0 mass % of Mg. Fe and Mg in the core material have a function of improving strength of the core material by fine precipitation hardening of Al—Fe—Si based, Al—Fe—Si—Mn based, or Mg—Si based intermetallic compound together with Si or Mn. The Fe content in the core material is preferably 0.05 mass % to 1.0 mass %, and particularly preferably 0.1 mass % to 0.5 mass %. When the Fe content in the core material is lower than the range described above, the effect is not sufficient. When the range exceeds the range described above, the grains after gazing become fine, and erosion occurs. The Mg content in the core material is preferably 0.1 mass % to 1.0 mass %, and preferably 0.2 mass % to 0.5 mass %. When the Mg content in the core material grains is lower than the range described above, the effect described above is not sufficient. When the Mg content exceeds the range described above, Mg is diffused into the surface of the brazing material in brazing under the atmosphere using a noncorrosive flux, and brazability markedly reduces.

In the brazing material according to the aluminum alloy brazing sheet according to the present invention, that is, in the aluminum alloy brazing sheet according to the present invention, the brazing material cladded onto the core material is made of an aluminum alloy, and includes Si as an indispensable composition.

The brazing material is made of an aluminum alloy including 4.0 mass % to 13 mass % of Si, with the balance being Al and unavoidable impurities.

Si in the brazing material lowers the melting point of Al to enhance the flowability and cause the function of brazing filler metal to exert. The content of Si in the brazing material is 4.0 mass % to 13 mass %, and preferably 7.0 mass % to 12 mass %. When the Si content in the brazing material is lower than the range described above, the flowability decreases, and the brazing material does not effectively function as the brazing filler metal. When the Si content exceeds the range described above, erosion to the core material or the other bonded portions increases.

The brazing material may further include Zn in addition to Si. Zn in the brazing material is capable of lowering the potential of the brazing material, and provides the brazing material with a sacrificial corrosion resistance effect. The Zn content in the brazing material is preferably 0.3 mass % to 5.0 mass %, and in particular, 0.8 mass % to 4.0 mass %. When the Zn content in the brazing material is lower than the range described above, the degree of lowering the potential is small, and the sacrificial corrosion resistance effect easily becomes insufficient. When the Zn content exceeds the range described above, the self corrosion speed of the brazing material increases, and the corrosion resistance of the brazing material deteriorates.

In the aluminum alloy brazing sheet according to the present invention, the total number density of single phase pure Si and the Si-including intermetallic compound with the grain size of 0.1 µm or more and 1.0 µm or less and existing in the sacrificial anode material cladded onto the core material is $1 \times 10^3$/mm$^2$ or more and $1 \times 10^6$/mm$^2$ or less. When the total number density of single phase pure Si and the Si-including intermetallic compound with the grain size described above in the sacrificial anode material falls within the range described above, pitting corrosion is more scattered, and growth of pitting corrosion in the sheet thickness direction is suppressed. This structure suppresses progress of pitting corrosion in the depth direction, and the life until corrosion penetration is prolonged. By contrast, when the total number density of single phase pure Si and the Si-including intermetallic compound with the grain size of 0.1 µm or more and 1.0 µm or less in the sacrificial anode material is lower than the range described above, pitting corrosion is not scattered, pitting corrosion progresses in the depth direction, and penetration occurs early. When the total number density exceeds the range described above, starting points of pitting corrosion increases too much, self corrosion resistance lowers, and the sacrificial anode material is worn early. For this reason, no sacrificial anti-corrosion effect can be obtained, and penetration occurs early. When single phase pure Si and an intermetallic compound with the grain size of 1.0 µm or more exists in the sacrificial anode material, the total number density of single phase pure Si and the Si-including intermetallic compound with the grain size of 0.1 µm or more and 1.0 µm or less is lower than $1 \times 10^3$/mm$^2$. In such a case, pitting corrosion is not scattered, but pitting corrosion progresses in the depth direction, and penetration occurs early.

In addition, fatigue fracture occurs when tensile stress is applied on, in particular, the internal skin material (cooling water side) of the surface of the brazing sheet and cracks occur and progress. As the strength of the material increases, cracks occur more rarely, and progress more slowly. Precipitation hardening serving as one of hardening mechanisms of metal materials occurs by impediment of dislocation movement with the precipitated compound. The hardening quantity is larger when the compound has a small size and is dispersed densely. In the aluminum alloy brazing sheet according to the present invention, fatigue fracture is improved, because the total number density of single phase pure Si and the Si-including intermetallic compound with the grain size of 0.1 µm to 1.0 µm and existing in the sacrificial anode material cladded onto the core material is $1 \times 10^3$/mm$^2$ to $1 \times 10^6$/mm$^2$.

Because single phase pure Si and a Si-including intermetallic compound with the grain size smaller than 0.1 µm scarcely exist in the sacrificial anode material, they are excluded from the target.

The following is an explanation of a method of manufacturing an aluminum alloy brazing sheet according to the present invention. The aluminum alloy brazing sheet according to the present invention is manufactured by cladding a brazing material made of an alloy of the composition described above onto one side surface of a core material formed in a sheet shape of an alloy of the composition described above, and cladding a sacrificial anode material made of an alloy of the composition described above on the other surface of the core material.

First, ingots are prepared by melting and casting each of aluminum alloys having respective desired chemical compositions used for the core material, the sacrificial anode material, and the brazing material. The methods of melting and casting are not specifically limited, but ordinary methods are used.

Thereafter, the aluminum alloy for the core material and the aluminum alloy for the sacrificial anode material are subjected to no homogenization, or subjected to homogenization at a temperature of 500° C. or less, and the aluminum alloy for the brazing material and the aluminum alloy for the sacrificial anode material are subjected to hot rolling to respective predetermined thicknesses.

In this operation, in hot rolling of the aluminum alloy for the sacrificial anode material, the hot rolling temperature of the aluminum alloy for the sacrificial anode material is set to 400° C. to 500° C., and preferably 420° C. to 480° C., to set the grain size of single phase pure Si and the Si-including intermetallic compound in the sacrificial anode material after cladding to 0.1 µm to 1.0 µm. Single phase pure Si and the Si-including intermetallic compound are precipitated during hot rolling, and the grain size of single phase pure Si and the Si-including intermetallic compound change according to the hot rolling temperature. Specifically, when the hot rolling temperature of the aluminum alloy for the sacrificial anode material is too high, single phase pure Si and the Si-including intermetallic compound are coarsened. Setting the hot rolling temperature of the aluminum alloy for the sacrificial anode material within the range described above causes no coarsening in single phase pure Si and the Si-including intermetallic compound precipitated finely in hot rolling, and produces single phase pure Si and the Si-including intermetallic compound with the grain size of 1.0 µm or less. By contrast, when the hot rolling temperature of the aluminum alloy for the sacrificial anode material is lower than the range described above, deformation resistance in hot rolling is large, and hot rolling becomes difficult. When the hot rolling temperature exceeds the range described above, the grain size of single phase pure Si and the Si-including intermetallic compound in the sacrificial anode material is coarsened to exceed 1.0 µm, and the number density thereof is reduced. In the present invention, the hot rolling temperature being 400° C. to 500° C., and preferably 420° C. to 480° C. means that the temperature of the aluminum alloy directly before hot rolling and the temperature of the aluminum alloy from the start to the end of hot rolling fall within the range of 400° C. to 500° C., and preferably 420° C. to 480° C.

In addition, in hot rolling of the aluminum alloy for the sacrificial anode material, the reduction of hot rolling of the aluminum alloy for the sacrificial anode material is set to 50% to 90%, to set the total number density of single phase pure Si and the Si-including intermetallic compound with the grain size of 0.1 µm to 1.0 µm in the sacrificial anode material after cladding to $1 \times 10^3/mm^2$ or more and $1 \times 10^6/mm^2$ or less. Single phase pure Si and the Si-including intermetallic compound are precipitated during hot rolling, and single phase pure Si and the Si-including intermetallic compound are precipitated much on dislocation introduced during hot rolling. For this reason, as the dislocation quantity increases, the number density of single phase pure Si and the Si-including intermetallic compound increases, and the grain size becomes fine. When the reduction of hot rolling of the aluminum alloy for the sacrificial anode material is lower than the range described above, the dislocation quantity introduced into the aluminum alloy for the sacrificial anode material is small, precipitation is difficult to occur, and the number density described above cannot be obtained. When the reduction exceeds the range described above, the dislocation quantity introduced into the aluminum alloy for the sacrificial anode material becomes too much, excessive precipitation occurs, and the density of the compound exceeds the predetermined quantity.

The temperature at which hot rolling of the aluminum alloy for the sacrificial anode material is not particularly limited. In addition, the sacrificial anode material rolled to a predetermined thickness is not wound in a coil shape, but retained in a sheet shape. For this reason, after hot rolling, the hot-rolled material of the aluminum alloy for the sacrificial anode material is more easily cooled than in the case where it is wound in a coil shape, and causes no coarsening of single phase pure Si and the intermetallic compound.

Thereafter, the materials are combined to form a clad material by hot rolling at 400° C. to 500° C. by a conventional method. The clad material is subjected to cold rolling to a predetermined thickness in the end, to manufacture the aluminum alloy brazing sheet according to the present invention. The clad material may be annealed (intermediate annealing) in the midway of the cold rolling process, or may be annealed (final annealing) thereafter. The annealing temperature is 200° C. to 400° C., and preferably 200° C. to 300° C. When the annealing temperature is lower than the range described above, the grain size of the core material after brazing heating is fine, and erosion occurs in the core material. In addition, when the annealing temperature exceeds the range described above, single phase pure Si and the Si-including intermetallic compound in the sacrificial anode material are coarsened, and the density thereof decreases. As the timing of annealing, the annealing may be intermediate annealing performed before the clad material reaches the final thickness, or final annealing performed after the clad material is reduced to the final thickness. Only one or both of intermediate annealing and final annealing may be performed.

As described above, the method for manufacturing an aluminum alloy brazing sheet according to the present invention is a manufacturing method for manufacturing the aluminum alloy brazing sheet according to the present invention, wherein in a manufacturing process of an aluminum alloy for the sacrificial anode material before combined as a clad material, the hot rolling temperature is set to 400° C. to 500° C., and the reduction of hot rolling is 50% to 90%.

The following is a more detailed explanation of the present invention based on embodiments, but the present invention is not limited thereto.

EXAMPLES

Examples

Each of the core material, the sacrificial node material layer, and the brazing material was manufactured under manufacturing conditions listed in Table 4 using alloys having respective compositions listed in Table 1, Table 2, and Table 3. In the chemical compositions listed in Table 1 to Table 3, the mark "–" means that the element is equal to or less than the detection limit, and the term "balance" includes unavoidable impurities.

First, DC casting was performed to cast an aluminum alloy listed in Table 1 and used for the core material, the aluminum alloy listed in Table 2 and used for the sacrificial anode material, and the aluminum alloy listed in Table 3 and used for the brazing material, and facing was further performed. The ingot for the sacrificial anode material was subjected to heating at temperatures listed in Table 4, and thereafter subjected to hot rolling with the reduction listed in Table 4. The ingot for the brazing material was subjected to heating at 480° C., and thereafter subjected to hot rolling to a predetermined thickness. The hot-rolled aluminum alloy for the sacrificial anode material was cladded onto one side surface of the ingot for the core material, and the aluminum alloy for the brazing material was cladded onto the other side surface thereof, to form a joined material (clad material) with the clad ratio of 15% for the sacrificial anode material, and 10% for the brazing material. The joined material was heated at 480° C., and thereafter rolled to 2.6 mm by hot clad rolling. Thereafter, the obtained rolled material was subjected to cold rolling, and subjected to intermediate annealing or final annealing, or both of them under the conditions listed in Table 4 to obtain sample materials. In the case of performing intermediate annealing, the final reduction was regulated to 30%. In the case of performing no intermediate annealing, the rolled material was subjected to cold annealing to the final thickness of 0.25 mm, and thereafter subjected to final annealing to obtain sample materials.

The values "grain size of single phase pure Si and the Si-including intermetallic compound in the sacrificial anode material" and "the total number density of single phase pure Si and the Si-including intermetallic compound in the sacrificial anode material" of each of sample materials prepared as described above were measured by the method described below.

(a) The Grain Size of Single Phase Pure Si and the Si-Including Intermetallic Compound in the Sacrificial Anode Material (μm)

The grain size of single phase pure Si and the Si-including intermetallic compound with 0.1 μm or more and 1.0 μm or less can be determined by observing the sacrificial anode material with a scanning electron microscope (SEM) and analyzing the SEM image. The term "grain size" means the circle equivalent diameter. The observed part is any part of the sacrificial anode material, such as any section along the thickness direction and/or a section parallel with the sheet material surface. From the viewpoint of convenience, measurement is preferably performed on any section along the thickness direction. Observation of three fields of view were performed on each of the sample materials, and SEM images of the respective fields of view were subjected to image analysis with "A-ZO-KUN" (manufactured by Asahi Kasei Engineering Corporation), to determine the grain size of single phase pure Si and the Si-including intermetallic compound before brazing heating. The grain size listed in the table is the arithmetic mean value of the numerical values obtained from the three fields of view.

(b) The Number Density of Single Phase Pure Si and the Si-Including Intermetallic Compound in the Sacrificial Anode Material ((number/mm$^2$)

The total number density of single phase pure Si and the Si-including intermetallic compound with the grain size of 0.1 μm or more and 1 μm or less is determined by observing the sacrificial anode material with an SEM and analyzing the SEM image. The observed part is any part of the sacrificial anode material, such as any section along the thickness direction and a section parallel with the sheet material surface. From the viewpoint of convenience, measurement is preferably performed on any section along the thickness direction. Observation of three fields of view was performed on each of the sample materials, and SEM images of the individual fields of view were subjected to image analysis with "A-ZO-KUN" (manufactured by Asahi Kasei Engineering Corporation), to determine the density of single phase pure Si and the Si-including intermetallic compound before brazing heating. The number density listed in the table is the arithmetic mean value of the numerical values obtained from the three fields of view.

In addition, each of the sample material prepared as described above was subjected to brazing-equivalent heating for 3 minutes at 600° C., and thereafter cooled at a speed of 50° C./min. Thereafter, the values of "tensile strength", "fatigue strength", "internal surface corrosion resistance", "external surface corrosion resistance", "fin bonding ratio", "occurrence of erosion", and "formability" of each of the sample materials were evaluated by the method described later.

(c) Tensile Strength

A JIS No. 5 test piece was cut out of each of the sample materials. Each of the test pieces was subjected to the brazing-equivalent heating, thereafter left for one week at a room temperature, and subjected to tensile test compliant with JIS Z 2241:2011. The samples with the tensile strength of 150 MPa or more were regarded as passed samples, and the samples with the tensile strength lower than 150 MPa were regarded as not failed samples.

(d) Fatigue Strength

A fatigue test piece (JIS Z 2275 No. 1 test piece) was cut out of each of the sample materials. Each of the test pieces was subjected to the brazing-equivalent heating, and thereafter left for one week at a room temperature. Each of the test pieces was subjected to pulsating plain bending fatigue test (compliant with JIS Z 2275) in which fixed stress 70 MPa is repeatedly loaded on a flat portion on the internal surface skin material side of the clad material at a frequency of 25 Hz at a room temperature, to measure the fracture life of the clad material. The samples with the measured fracture life of one million times or longer were evaluated as passed samples (○), and the samples with the measured fracture life shorter than one million times were evaluated as failed samples (×).

(e) Internal Surface Corrosion Resistance (Under Acidic Environment)

The sacrificial anode material surface of each of the sample materials subjected to heating equivalent to brazing was subjected to immersion test simulating an acidic environment in a water-based coolant. The test surface of the test piece of each of the sample materials was immersed in an aqueous solution including 195 ppm of Cl$^-$, 60 ppm of $SO_4^{2-}$, 1 ppm of $Cu^{2+}$, and 30 ppm of $Fe^{2+}$, at a temperature of 88° C. for 8 hours with the solution volume to specimen area ratio of 10 mL/cm$^2$, and thereafter each of the test pieces was left at 25° C. for 16 hours. Such a cycle was performed for 3 months. After the immersion cycle test, the cases where no penetration occurred were evaluated as passed samples (○), and the case where penetration occurred were evaluated as failed samples (×). The part other than the test surface was masked to prevent contact with the test aqueous solution.

(f) Internal Surface Corrosion Resistance (Under Alkaline Environment)

The sacrificial anode material surface of each of the sample materials subjected to heating equivalent to brazing was subjected to immersion test simulating an alkaline environment in a water-based coolant. The test surface of the test piece of each of the sample materials was immersed in an aqueous solution including 195 ppm of Cl$^-$, 60 ppm of $SO_4^{2-}$, 1 ppm of $Cu^{2+}$, and 30 ppm of $Fe^{2+}$ and regulated to a pH of 10 with NaOH, at a temperature of 88° C. for 8 hours with the solution volume to specimen area ratio of 10 mL/cm$^2$, and thereafter each of the test pieces was left at 25° C. for 16 hours. Such a cycle was performed for 3 months. After the immersion cycle test, the cases where no penetration occurred were evaluated as passed samples (○), and the case where penetration occurred were evaluated as failed samples (×). The part other than the test surface was masked to prevent contact with the test aqueous solution.

(g) External Surface Corrosion Resistance

The fin material made of an alloy obtained by adding 1.5% of Zn to JIS 3003 alloy was corrugated, and assembled with the brazing material surface of each of the brazing sheet samples. Thereafter, the assembled samples were immersed in a 10% fluoride flux suspension, dried at 200° C., and thereafter subjected to brazing heating at 600° C.×3 minutes to prepare test cores. The brazing material surfaces of the test cores were subjected to SWAAT test for 500 hours on the basis of ASTM-G85. After the test, a corrosive on the surface of each of the test pieces was removed, and the corrosion depth was measured. In each test piece, 10 parts were measured, and the maximum value of the parts was evaluated as the corrosion depth. The samples with the corrosion depth smaller than 70 μm were evaluated as excellent samples (○○), the samples with the corrosion depth of 70 μm or more and 90 μm or less were evaluated as good samples (○), and the samples with the corrosion depth exceeding 90 μm and the samples in which penetration occurred were evaluated as failed samples (×). The part other than the test surface was masked to prevent contact with the test aqueous solution.

(h) Fin Bonding Ratio

The fin material made of an alloy obtained by adding 1.5% of Zn to JIS 3003 alloy was corrugated, and assembled with the brazing material surface of each of the brazing sheet samples. Thereafter, the assembled samples were immersed in a 10% fluoride flux suspension, dried at 200° C., and thereafter subjected to brazing heating at 600° C.×3 minutes to prepare test cores. In the test cores, the ratio of the number of tops of bonded fins to the total number of tops of the fins was evaluated as the fin bonding ratio. The samples with the fin bonding ratio of 95% or more were evaluated as passed samples (○) in brazability, and the samples with the fin bonding ratio lower than 95% were evaluated as failed samples (×) in brazability.

(i) Occurrence of Erosion

The micro-observation was performed on the test core sections prepared in above item (h) to check occurrence of erosion (diffusion of brazing filler metal) and melting of the material in the core material and/or the sacrificial anode material. The samples in which neither erosion nor melting of the material was occurred were evaluated as passed samples (○), and the samples in which at least one of erosion and melting of the material occurred were evaluated as failed samples (×).

TABLE 1

| Alloy Symbol Core Material | Chemical Composition (mass %) | | | | | | | | | |
|---|---|---|---|---|---|---|---|---|---|---|
| | Si | Cu | Mn | Cr | Zr | Ti | V | Fe | Mg | Balance |
| A1 | 0.75 | 0.9 | 1.45 | — | — | — | — | — | — | Al |
| A2 | 0.3 | 0.9 | 1.45 | — | — | — | — | — | — | Al |
| A3 | 1.2 | 0.9 | 1.45 | — | — | — | — | — | — | Al |
| A4 | 0.4 | 0.9 | 1.45 | — | — | — | — | — | — | Al |
| A5 | 1.0 | 0.9 | 1.45 | — | — | — | — | — | — | Al |
| A6 | 0.75 | 0.1 | 1.45 | — | — | — | — | — | — | Al |
| A7 | 0.75 | 1.5 | 1.45 | — | — | — | — | — | — | Al |
| A8 | 0.75 | 0.5 | 1.45 | — | — | — | — | — | — | Al |
| A9 | 0.75 | 1.3 | 1.45 | — | — | — | — | — | — | Al |
| A10 | 0.75 | 0.9 | 0.3 | — | — | — | — | — | — | Al |
| A11 | 0.75 | 0.9 | 2.0 | — | — | — | — | — | — | Al |
| A12 | 0.75 | 0.9 | 1.0 | — | — | — | — | — | — | Al |
| A13 | 0.75 | 0.9 | 1.9 | — | — | — | — | — | — | Al |
| A14 | 0.75 | 0.9 | 1.45 | 0.3 | — | — | — | — | — | Al |
| A15 | 0.75 | 0.9 | 1.45 | 0.01 | — | — | — | — | — | Al |
| A16 | 0.75 | 0.9 | 1.45 | — | 0.3 | — | — | — | — | Al |
| A17 | 0.75 | 0.9 | 1.45 | — | 0.01 | — | — | — | — | Al |
| A18 | 0.75 | 0.9 | 1.45 | — | — | 0.3 | — | — | — | Al |
| A19 | 0.75 | 0.9 | 1.45 | — | — | 0.01 | — | — | — | Al |
| A20 | 0.75 | 0.9 | 1.45 | — | — | — | 0.3 | — | — | Al |
| A21 | 0.75 | 0.9 | 1.45 | — | — | — | 0.01 | — | — | Al |
| A22 | 0.75 | 0.9 | 1.45 | — | — | — | — | 1 | — | Al |
| A23 | 0.75 | 0.9 | 1.45 | — | — | — | — | 0.05 | — | Al |
| A24 | 0.75 | 0.9 | 1.45 | — | — | — | — | 0.5 | — | Al |
| A25 | 0.75 | 0.9 | 1.45 | — | — | — | — | 0.1 | — | Al |
| A26 | 0.75 | 0.9 | 1.45 | — | — | — | — | — | 1 | Al |
| A27 | 0.75 | 0.9 | 1.45 | — | — | — | — | — | 0.1 | Al |
| A28 | 0.75 | 0.9 | 1.45 | — | — | — | — | — | 0.5 | Al |
| A29 | 0.75 | 0.9 | 1.45 | — | — | — | — | — | 0.2 | Al |
| A30 | 0.2 | 0.9 | 1.45 | — | — | — | — | — | — | Al |
| A31 | 1.4 | 0.9 | 1.45 | — | — | — | — | — | — | Al |
| A32 | 0.75 | 0.05 | 1.45 | — | — | — | — | — | — | Al |
| A33 | 0.75 | 1.7 | 1.45 | — | — | — | — | — | — | Al |
| A34 | 0.75 | 0.9 | 0.2 | — | — | — | — | — | — | Al |
| A35 | 0.75 | 0.9 | 2.2 | — | — | — | — | — | — | Al |
| A36 | 0.75 | 0.9 | 1.45 | 0.35 | — | — | — | — | — | Al |
| A37 | 0.75 | 0.9 | 1.45 | — | 0.35 | — | — | — | — | Al |
| A38 | 0.75 | 0.9 | 1.45 | — | — | 0.35 | — | — | — | Al |
| A39 | 0.75 | 0.9 | 1.45 | — | — | — | 0.35 | — | — | Al |
| A40 | 0.75 | 0.9 | 1.45 | — | — | — | — | 1.1 | — | Al |
| A41 | 0.75 | 0.9 | 1.45 | — | — | — | — | — | 1.1 | Al |

TABLE 2

| Alloy Symbol Sacrificial Material | Chemical Composition (mass %) | | | | | | | |
|---|---|---|---|---|---|---|---|---|
| | Si | Zn | Cr | Zr | Ti | V | Fe | Mg | Balance |
| B1 | 1.0 | 5.5 | — | — | — | — | — | — | Al |
| B2 | 0.5 | 5.5 | — | — | — | — | — | — | Al |
| B3 | 1.5 | 5.5 | — | — | — | — | — | — | Al |
| B4 | 0.7 | 5.5 | — | — | — | — | — | — | Al |
| B5 | 1.3 | 5.5 | — | — | — | — | — | — | Al |
| B6 | 1.0 | 1.0 | — | — | — | — | — | — | Al |
| B7 | 1.0 | 8.0 | — | — | — | — | — | — | Al |
| B8 | 1.0 | 4.0 | — | — | — | — | — | — | Al |
| B9 | 1.0 | 7.0 | — | — | — | — | — | — | Al |
| B10 | 1.0 | 5.5 | 0.30 | — | — | — | — | — | Al |
| B11 | 1.0 | 5.5 | 0.01 | — | — | — | — | — | Al |
| B12 | 1.0 | 5.5 | — | 0.30 | — | — | — | — | Al |
| B13 | 1.0 | 5.5 | — | 0.01 | — | — | — | — | Al |
| B14 | 1.0 | 5.5 | — | — | 0.30 | — | — | — | Al |
| B15 | 1.0 | 5.5 | — | — | 0.01 | — | — | — | Al |
| B16 | 1.0 | 5.5 | — | — | — | 0.30 | — | — | Al |
| B17 | 1.0 | 5.5 | — | — | — | 0.01 | — | — | Al |
| B18 | 1.0 | 5.5 | — | — | — | — | 0.50 | — | Al |
| B19 | 1.0 | 5.5 | — | — | — | — | 0.05 | — | Al |
| B20 | 1.0 | 5.5 | — | — | — | — | 0.30 | — | Al |
| B21 | 1.0 | 5.5 | — | — | — | — | 0.10 | — | Al |
| B22 | 1.0 | 5.5 | — | — | — | — | — | 2.50 | Al |
| B23 | 1.0 | 5.5 | — | — | — | — | — | 0.10 | Al |
| B24 | 1.0 | 5.5 | — | — | — | — | — | 2.00 | Al |
| B25 | 1.0 | 5.5 | — | — | — | — | — | 0.20 | Al |
| B26 | 0.3 | 5.5 | — | — | — | — | — | — | Al |
| B27 | 1.7 | 5.5 | — | — | — | — | — | — | Al |
| B28 | 1.0 | 0.8 | — | — | — | — | — | — | Al |
| B29 | 1.0 | 3.2 | — | — | — | — | — | — | Al |
| B30 | 1.0 | 5.5 | 0.35 | — | — | — | — | — | Al |
| B31 | 1.0 | 5.5 | — | 0.35 | — | — | — | — | Al |
| B32 | 1.0 | 5.5 | — | — | 0.35 | — | — | — | Al |
| B33 | 1.0 | 5.5 | — | — | — | 0.35 | — | — | Al |
| B34 | 1.0 | 5.5 | — | — | — | — | 0.70 | — | Al |
| B35 | 1.0 | 5.5 | — | — | — | — | — | 3.00 | Al |

TABLE 3

| Alloy Symbol Brazing Material | Chemical Composition (mass %) | | |
|---|---|---|---|
| | Si | Zn | Balance |
| C1 | 10.0 | — | Al |
| C2 | 4.0 | — | Al |
| C3 | 13.0 | — | Al |
| C4 | 7.0 | — | Al |
| C5 | 12.0 | — | Al |
| C6 | 10.0 | 0.3 | Al |
| C7 | 10.0 | 5.0 | Al |
| C8 | 10.0 | 0.8 | Al |
| C9 | 10.0 | 4.0 | Al |
| C10 | 3.5 | — | Al |
| C11 | 13.5 | — | Al |
| C12 | 10.0 | 5.2 | Al |

TABLE 4

| Manufacturing Process No. | Sacrificial Anode Material | | Clad Material | |
|---|---|---|---|---|
| | Hot Rolling Start Temperature (° C.) | Hot Rolling Reduction (%) | Intermediate Annealing | Final Annealing |
| 1 | 400 | 75 | — | 230 |
| 2 | 500 | 75 | — | 230 |
| 3 | 420 | 75 | — | 230 |
| 4 | 480 | 75 | — | 230 |
| 5 | 350 | 75 | — | 230 |
| 6 | 550 | 75 | — | 230 |
| 7 | 480 | 50 | — | 230 |
| 8 | 480 | 90 | — | 230 |
| 9 | 480 | 60 | — | 230 |
| 10 | 480 | 85 | — | 230 |
| 11 | 480 | 30 | — | 230 |
| 12 | 480 | 95 | — | 230 |
| 13 | 480 | 75 | — | 200 |
| 14 | 480 | 75 | — | 400 |
| 15 | 480 | 75 | 230 | — |
| 16 | 480 | 75 | 230 | 230 |

TABLE 5

| | Brazing Material | Core Material Alloy No. | Sacrificial Anode Material | Brazing Material Alloy No. | Manufacturing Process No. | Tensile Strength After Brazing | Compound Grain Size in Sacrificial Anode Material (µm) | Fatigue Strength In Sacrificial Anode Material | Number of Times Until Fracture | Evaluation | Internal Surface Corrosion Resistance Acidic | Alkaline | External Surface Corrosion Resistance | Fin Bonding Ratio Bonding Ratio (%) | Evaluation | Erosion | Formability of Test Piece |
|---|---|---|---|---|---|---|---|---|---|---|---|---|---|---|---|---|---|
| Example | 1 | A1 | B1 | C1 | 4 | 180 | 0.1 or more and 1 or less | 7.9.E+05 | 4.7.E+06 | ○ | ○ | ○ | ○ | 100 | ○ | ○ | ○ |
| | 2 | A1 | B1 | C2 | 4 | 180 | 0.1 or more and 1 or less | 3.6.E+04 | 3.9.E+00 | ○ | ○ | ○ | ○ | 100 | ○ | ○ | ○ |
| | 3 | A1 | B1 | C3 | 4 | 179 | 0.1 or more and 1 or less | 3.9.E+05 | 7.4.E+06 | ○ | ○ | ○ | ○ | 100 | ○ | ○ | ○ |
| | 4 | A1 | B1 | C4 | 4 | 184 | 0.1 or more and 1 or less | 3.1.E+05 | 9.0.E+06 | ○ | ○ | ○ | ○ | 100 | ○ | ○ | ○ |
| | 5 | A1 | B1 | C5 | 4 | 183 | 0.1 or more and 1 or less | 3.5.E+05 | 7.7.E+06 | ○ | ○ | ○ | ○ | 100 | ○ | ○ | ○ |
| | 6 | A1 | B1 | C6 | 4 | 180 | 0.1 or more and 1 or less | 3.1.E+05 | 5.5.E+06 | ○ | ○ | ○ | ○○ | 100 | ○ | ○ | ○ |
| | 7 | A1 | B1 | C7 | 4 | 180 | 0.1 or more and 1 or less | 4.2.E+05 | 6.5.E+06 | ○ | ○ | ○ | ○○ | 100 | ○ | ○ | ○ |
| | 8 | A1 | B1 | C8 | 4 | 183 | 0.1 or more and 1 or less | 1.2.E+05 | 1.0.E+07 | ○ | ○ | ○ | ○○ | 100 | ○ | ○ | ○ |
| | 9 | A1 | B1 | C9 | 4 | 180 | 0.1 or more and 1 or less | 7.2.E+05 | 3.5.E+06 | ○ | ○ | ○ | ○ | 100 | ○ | ○ | ○ |
| Comparative Example | 1 | A1 | B1 | C10 | 4 | 182 | 0.1 or more and 1 or less | 1.9.E+05 | 5.8.E+06 | ○ | ○ | ○ | ○ | 80 | × | ○ | ○ |
| | 2 | A1 | B1 | C11 | 4 | 182 | 0.1 or more and 1 or less | 5.9.E+05 | 2.5.E+06 | ○ | ○ | ○ | ○ | 100 | ○ | × | ○ |
| | 3 | A1 | B1 | C12 | 4 | 182 | 0.1 or more and 1 or less | 5.0.E+05 | 6.2.E+06 | ○ | ○ | ○ | × | 100 | ○ | ○ | ○ |

TABLE 6

| | Sacrificial Anode Material | Core Material Alloy No. | Sacrificial Anode Material | Brazing Material Alloy No. | Manufacturing Process No. | Tensile Strength After Brazing | Compound Grain Size in Sacrificial Anode Material (μm) | Fatigue Strength In Sacrificial Anode Material | Fatigue Strength Number of Times Until Fracture | Fatigue Strength Evaluation | Internal Surface Corrosion Resistance Acidic | Internal Surface Corrosion Resistance Alkaline | External Surface Corrosion Resistance | Fin Bonding Ratio Bonding Ratio (%) | Fin Bonding Ratio Evaluation | Erosion | Formability of Test Piece |
|---|---|---|---|---|---|---|---|---|---|---|---|---|---|---|---|---|---|
| Example | 11 | A1 | B2 | C1 | 4 | 179 | 0.1 or more and 1 or less | 1.3.E+04 | 3.7.E+06 | ○ | ○ | ○ | ○ | 100 | ○ | ○ | ○ |
| | 12 | A1 | B3 | C1 | 4 | 182 | 0.1 or more and 1 or less | 4.1.E+06 | 2.8.E+06 | ○ | ○ | ○ | ○ | 100 | ○ | ○ | ○ |
| | 13 | A1 | B4 | C1 | 4 | 175 | 0.1 or more and 1 or less | 8.2.E+05 | 6.9.E+06 | ○ | ○ | ○ | ○ | 100 | ○ | ○ | ○ |
| | 14 | A1 | B5 | C1 | 4 | 182 | 0.1 or more and 1 or less | 6.5.E+04 | 8.7.E+06 | ○ | ○ | ○ | ○ | 100 | ○ | ○ | ○ |
| | 15 | A1 | B6 | C1 | 4 | 181 | 0.1 or more and 1 or less | 3.1.E+06 | 3.7.E+06 | ○ | ○ | ○ | ○ | 100 | ○ | ○ | ○ |
| | 16 | A1 | B7 | C1 | 4 | 178 | 0.1 or more and 1 or less | 3.5.E+05 | 5.7.E+06 | ○ | ○ | ○ | ○ | 100 | ○ | ○ | ○ |
| | 17 | A1 | B8 | C1 | 4 | 179 | 0.1 or more and 1 or less | 3.3.E+05 | 8.0.E+06 | ○ | ○ | ○ | ○ | 100 | ○ | ○ | ○ |
| | 18 | A1 | B9 | C1 | 4 | 184 | 0.1 or more and 1 or less | 2.7.E+0.5 | 7.4.E+06 | ○ | ○ | ○ | ○ | 100 | ○ | ○ | ○ |
| | 19 | A1 | B10 | C1 | 4 | 187 | 0.1 or more and 1 or less | 1.9.E+05 | 4.8.E+05 | ○ | ○ | ○ | ○ | 100 | ○ | ○ | ○ |
| | 20 | A1 | B11 | C1 | 4 | 183 | 0.1 or more and 1 or less | 7.3.E+05 | 5.4.E+06 | ○ | ○ | ○ | ○ | 100 | ○ | ○ | ○ |
| | 21 | A1 | B12 | C1 | 4 | 187 | 0.1 or more and 1 or less | 3.5.E+04 | 4.9.E+05 | ○ | ○ | ○ | ○ | 100 | ○ | ○ | ○ |
| | 22 | A1 | B13 | C1 | 4 | 183 | 0.1 or more and 1 or less | 5.1.E+05 | 4.7.E+06 | ○ | ○ | ○ | ○ | 100 | ○ | ○ | ○ |

TABLE 6-continued

| Sacrificial Anode Material | Core Material Alloy No. | Sacrificial Anode Material | Brazing Material Alloy No. | Manufacturing Process No. | Tensile Strength After Brazing | Compound Grain Size in Sacrificial Anode Material (μm) | Fatigue Strength In Sacrificial Anode Material | Fatigue Strength Number of Times Until Fracture | Fatigue Strength Evaluation | Internal Surface Corrosion Resistance Acidic | Internal Surface Corrosion Resistance Alkaline | External Surface Corrosion Resistance | Fin Bonding Ratio Bonding Ratio (%) | Fin Bonding Ratio Evaluation | Erosion | Formability of Test Piece |
|---|---|---|---|---|---|---|---|---|---|---|---|---|---|---|---|---|
| 23 | A1 | B14 | C1 | 4 | 186 | 0.1 or more and 1 or less | 7.9.E+04 | 6.2.E+06 | ○ | ○ | ○ | ○ | 100 | ○ | ○ | ○ |
| 24 | A1 | B15 | C1 | 4 | 184 | 0.1 or more and 1 or less | 5.4.E+05 | 7.7.E+06 | ○ | ○ | ○ | ○ | 100 | ○ | ○ | ○ |
| 25 | A1 | B16 | C1 | 4 | 191 | 0.1 or more and 1 or less | 6.3.E+05 | 4.3.E+05 | ○ | ○ | ○ | ○ | 100 | ○ | ○ | ○ |
| 26 | A1 | B17 | C1 | 4 | 182 | 0.1 or more and 1 or less | 3.8.E+05 | 2.4.E+06 | ○ | ○ | ○ | ○ | 100 | ○ | ○ | ○ |
| 27 | A1 | B18 | C1 | 4 | 188 | 0.1 or more and 1 or less | 6.5.E+05 | 2.2.E+06 | ○ | ○ | ○ | ○ | 100 | ○ | ○ | ○ |
| 28 | A1 | B19 | C1 | 4 | 185 | 0.1 or more and 1 or less | 1.1.E+05 | 4.0.E+06 | ○ | ○ | ○ | ○ | 100 | ○ | ○ | ○ |
| 29 | A1 | B20 | C1 | 4 | 188 | 0.1 or more and 1 or less | 1.5.E+05 | 7.0.E+06 | ○ | ○ | ○ | ○ | 100 | ○ | ○ | ○ |
| 30 | A1 | B21 | C1 | 4 | 183 | 0.1 or more and 1 or less | 6.1.E+05 | 2.4.E+06 | ○ | ○ | ○ | ○ | 100 | ○ | ○ | ○ |
| 31 | A1 | B22 | C1 | 4 | 192 | 0.1 or more and 1 or less | 5.1.E+05 | 6.1.E+05 | ○ | ○ | ○ | ○ | 100 | ○ | ○ | ○ |
| 32 | A1 | B23 | C1 | 4 | 183 | 0.1 or more and 1 or less | 3.3.E+05 | 3.0.E+06 | ○ | ○ | ○ | ○ | 100 | ○ | ○ | ○ |
| 33 | A1 | B24 | C1 | 4 | 189 | 0.1 or more and 1 or less | 2.4.E+05 | 7.0.E+06 | ○ | ○ | ○ | ○ | 100 | ○ | ○ | ○ |
| 34 | A1 | B25 | C1 | 4 | 190 | 0.1 or more and 1 or less | 8.0.E+05 | 2.2.E+06 | ○ | ○ | ○ | ○ | 100 | ○ | ○ | ○ |
| Comparative Example 4 | A1 | B26 | C1 | 4 | 176 | 0.1 or more and 1 or less | 9.7.E+02 | 1.0.E+07 | ○ | ○ | × | ○ | 100 | ○ | ○ | ○ |
| 5 | A1 | B27 | C1 | 4 | 176 | 0.1 or more and 1 or less | 1.4.E+06 | 3.7.E+06 | ○ | ○ | ○ | ○ | 100 | ○ | × | ○ |

TABLE 6-continued

| Sacrificial Anode Material | Core Material Alloy No. | Sacrificial Anode Material | Brazing Material Alloy No. | Manufacturing Process No. | Tensile Strength After Brazing | Compound Grain Size in Sacrificial Anode Material (μm) | Fatigue Strength In Sacrificial Anode Material | Number of Times Until Fracture | Evaluation | Internal Surface Corrosion Resistance Acidic | Alkaline | External Surface Corrosion Resistance | Fin Bonding Ratio Bonding Ratio (%) | Evaluation | Erosion | Formability of Test Piece |
|---|---|---|---|---|---|---|---|---|---|---|---|---|---|---|---|---|
| 6 | A1 | B28 | C1 | 4 | 179 | 0.1 or more and 1 or less | 4.3.E+05 | 4.1.E+06 | ○ | × | × | ○ | 100 | ○ | ○ | ○ |
| 7 | A1 | B29 | C1 | 4 | 184 | 0.1 or more and 1 or less | 2.7.E+05 | 4.9.E+06 | ○ | × | × | ○ | 100 | ○ | ○ | ○ |
| 8 | A1 | B30 | C1 | 4 | — | — | — | — | — | — | — | — | — | — | — | × |
| 9 | A1 | B31 | C1 | 4 | — | — | — | — | — | — | — | — | — | — | — | × |
| 10 | A1 | B32 | C1 | 4 | — | — | — | — | — | — | — | — | — | — | — | × |
| 11 | A1 | B33 | C1 | 4 | — | — | — | — | — | — | — | — | — | — | — | × |
| 12 | A1 | B34 | C1 | 4 | 193 | 0.1 or more and 1 or less | 1.5.E+06 | 2.5.E+06 | ○ | ○ | × | ○ | 100 | ○ | ○ | ○ |
| 13 | A1 | B35 | C1 | 4 | 196 | 0.1 or more and 1 or less | 3.9.E+06 | 6.2.E+06 | ○ | ○ | × | ○ | 100 | ○ | ○ | ○ |

TABLE 7

| | Core Material | | Sacrificial Anode Material | Brazing Material Alloy No. | Manufacturing Process No. | Tensile Strength After Brazing | Compound Grain Size in Sacrificial Anode Material (μm) | Fatigue Strength | | | Internal Surface Corrosion Resistance | | External Surface Corrosion Resistance | Fin Bonding Ratio | | Erosion | Formability of Test Piece |
|---|---|---|---|---|---|---|---|---|---|---|---|---|---|---|---|---|---|
| | | Alloy No. | | | | | | In Sacrificial Anode Material | Number of Times Until Fracture | Evaluation | Acidic | Alkaline | | Bonding Ratio (%) | Evaluation | | |
| Example | 35 | A2 | B1 | C1 | 4 | 155 | 0.1 or more and 1 or less | 8.5.E+05 | 9.9.E+05 | ○ | ○ | ○ | ○ | 100 | ○ | ○ | ○ |
| | 36 | A3 | B1 | C1 | 4 | 185 | 0.1 or more and 1 or less | 5.4.E+05 | 6.2.E+06 | ○ | ○ | ○ | ○ | 100 | ○ | ○ | ○ |
| | 37 | A4 | B1 | C1 | 4 | 162 | 0.1 or more and 1 or less | 3.2.E+05 | 4.6.E+06 | ○ | ○ | ○ | ○ | 100 | ○ | ○ | ○ |
| | 38 | A5 | B1 | C1 | 4 | 171 | 0.1 or more and 1 or less | 1.5.E+05 | 4.7.E+06 | ○ | ○ | ○ | ○ | 100 | ○ | ○ | ○ |
| | 39 | A6 | B1 | C1 | 4 | 151 | 0.1 or more and 1 or less | 6.8.E+05 | 2.2.E+05 | ○ | ○ | ○ | ○ | 100 | ○ | ○ | ○ |
| | 40 | A7 | B1 | C1 | 4 | 212 | 0.1 or more and 1 or less | 4.0.E+05 | 8.6.E+06 | ○ | ○ | ○ | ○ | 100 | ○ | ○ | ○ |
| | 41 | A8 | B1 | C1 | 4 | 157 | 0.1 or more and 1 or less | 7.9.E+05 | 4.0.E+06 | ○ | ○ | ○ | ○ | 100 | ○ | ○ | ○ |
| | 42 | A9 | B1 | C1 | 4 | 205 | 0.1 or more and 1 or less | 7.9.E+05 | 7.2.E+06 | ○ | ○ | ○ | ○ | 100 | ○ | ○ | ○ |
| | 43 | A10 | B1 | C1 | 4 | 152 | 0.1 or more and 1 or less | 7.4.E+05 | 5.9.E+05 | ○ | ○ | ○ | ○ | 100 | ○ | ○ | ○ |
| | 44 | A11 | B1 | C1 | 4 | 190 | 0.1 or more and 1 or less | 2.8.E+05 | 6.8.E+06 | ○ | ○ | ○ | ○ | 100 | ○ | ○ | ○ |
| | 45 | A12 | B1 | C1 | 4 | 177 | 0.1 or more and 1 or less | 4.7.E+05 | 9.9.E+06 | ○ | ○ | ○ | ○ | 100 | ○ | ○ | ○ |
| | 46 | A13 | B1 | C1 | 4 | 187 | 0.1 or more and 1 or less | 6.4.E+05 | 3.4.E+06 | ○ | ○ | ○ | ○ | 100 | ○ | ○ | ○ |
| | 47 | A14 | B1 | C1 | 4 | 186 | 0.1 or more and 1 or less | 3.3.E+05 | 6.4.E+06 | ○ | ○ | ○ | ○ | 100 | ○ | ○ | ○ |

TABLE 7-continued

| | Core Material Alloy No. | Sacrificial Anode Material | Brazing Material Alloy No. | Manufacturing Process No. | Tensile Strength After Brazing | Compound Grain Size in Sacrificial Anode Material (μm) | Fatigue Strength In Sacrificial Anode Material | Number of Times Until Fracture | Evaluation | Internal Surface Corrosion Resistance Acidic | Alkaline | External Surface Corrosion Resistance | Fin Bonding Ratio Bonding Ratio (%) | Evaluation | Erosion | Formability of Test Piece |
|---|---|---|---|---|---|---|---|---|---|---|---|---|---|---|---|---|
| 48 A15 | A15 | B1 | C1 | 4 | 184 | 0.1 or more and 1 or less | 8.5.E+04 | 2.1.E+06 | ○ | ○ | ○ | ○ | 100 | ○ | ○ | ○ |
| 49 A16 | A16 | B1 | C1 | 4 | 190 | 0.1 or more and 1 or less | 6.3.E+05 | 2.4.E+06 | ○ | ○ | ○ | ○ | 100 | ○ | ○ | ○ |
| 50 A17 | A17 | B1 | C1 | 4 | 184 | 0.1 or more and 1 or less | 4.4.E+05 | 7.0.E+05 | ○ | ○ | ○ | ○ | 100 | ○ | ○ | ○ |
| 51 A18 | A18 | B1 | C1 | 4 | 186 | 0.1 or more and 1 or less | 5.0.E+05 | 4.4.E+06 | ○ | ○ | ○ | ○ | 100 | ○ | ○ | ○ |
| 52 A19 | A19 | B1 | C1 | 4 | 185 | 0.1 or more and 1 or less | 1.2.E+05 | 5.9.E+06 | ○ | ○ | ○ | ○ | 100 | ○ | ○ | ○ |
| 53 A20 | A20 | B1 | C1 | 4 | 186 | 0.1 or more and 1 or less | 7.9.E+05 | 2.2.E+06 | ○ | ○ | ○ | ○ | 100 | ○ | ○ | ○ |
| 54 A21 | A21 | B1 | C1 | 4 | 183 | 0.1 or more and 1 or less | 3.8.E+05 | 3.0.E+06 | ○ | ○ | ○ | ○ | 100 | ○ | ○ | ○ |
| 55 A22 | A22 | B1 | C1 | 4 | 193 | 0.1 or more and 1 or less | 6.1.E+05 | 3.4.E+06 | ○ | ○ | ○ | ○ | 100 | ○ | ○ | ○ |
| 56 A23 | A23 | B1 | C1 | 4 | 182 | 0.1 or more and 1 or less | 6.7.E+05 | 4.2.E+05 | ○ | ○ | ○ | ○ | 100 | ○ | ○ | ○ |
| 57 A24 | A24 | B1 | C1 | 4 | 190 | 0.1 or more and 1 or less | 1.9.E+05 | 7.3.E+06 | ○ | ○ | ○ | ○ | 100 | ○ | ○ | ○ |
| 58 A25 | A25 | B1 | C1 | 4 | 185 | 0.1 or more and 1 or less | 4.3.E+05 | 1.1.E+06 | ○ | ○ | ○ | ○ | 100 | ○ | ○ | ○ |
| 59 A26 | A26 | B1 | C1 | 4 | 228 | 0.1 or more and 1 or less | 5.8.E+05 | 2.8.E+07 | ○ | ○ | ○ | ○ | 100 | ○ | ○ | ○ |
| 60 A27 | A27 | B1 | C1 | 4 | 190 | 0.1 or more and 1 or less | 1.1.E+05 | 1.0.E+06 | ○ | ○ | ○ | ○ | 100 | ○ | ○ | ○ |
| 61 A28 | A28 | B1 | C1 | 4 | 220 | 0.1 or more and 1 or less | 5.9.E+05 | 3.1.E+07 | ○ | ○ | ○ | ○ | 100 | ○ | ○ | ○ |

TABLE 7-continued

| Core Material | | Sacrificial Anode Material | Brazing Material | Manufacturing Process No. | Tensile Strength After Brazing | Compound Grain Size in Sacrificial Material (μm) | Fatigue Strength | | | Internal Surface Corrosion Resistance | | External Surface Corrosion Resistance | Fin Bonding Ratio | | Erosion | Formability of Test Piece |
|---|---|---|---|---|---|---|---|---|---|---|---|---|---|---|---|---|
| | | | | | | | Number of Times Until Fracture In Sacrificial Anode Material | | Evaluation | Acidic | Alkaline | | Bonding Ratio (%) | Evaluation | | |
| | Alloy No. | Alloy No. | Alloy No. | | | | | | | | | | | | | |
| | 62 A29 | B1 | C1 | 4 | 195 | 0.1 or more and 1 or less | 2.4.B+05 | 7.3.E+06 | ○ | ○ | ○ | ○ | 100 | ○ | ○ | ○ |
| Comparative Example | | | | | | | | | | | | | | | | |
| 14 A30 | | B1 | C1 | 4 | 149 | 0.1 or more and 1 or less | 8.7.E+04 | 6.2.E+06 | ○ | ○ | ○ | ○ | 100 | ○ | ○ | ○ |
| 15 A31 | | B1 | C1 | 4 | 190 | 0.1 or more and 1 or less | 3.6.E+05 | 3.2.E+06 | ○ | ○ | ○ | ○ | 100 | ○ | × | ○ |
| 16 A32 | | B1 | C1 | 4 | 137 | 0.1 or more and 1 or less | 6.8.E+04 | 9.6.E+06 | ○ | × | × | ○ | 100 | ○ | ○ | ○ |
| 17 A33 | | B1 | C1 | 4 | 220 | 0.1 or more and 1 or less | 2.1.E+05 | 4.6.E+06 | ○ | ○ | ○ | ○ | 100 | ○ | × | ○ |
| 18 A34 | | B1 | C1 | 4 | 148 | 0.1 or more and 1 or less | 8.5.E+05 | 8.7.E+06 | ○ | × | × | ○ | 100 | ○ | ○ | ○ |
| 19 A35 | | B1 | C1 | 4 | — | — | — | — | — | — | — | — | — | — | — | × |
| 20 A36 | | B1 | C1 | 4 | — | — | — | — | — | — | — | — | — | — | — | × |
| 21 A37 | | B1 | C1 | 4 | — | — | — | — | — | — | — | — | — | — | — | × |
| 22 A38 | | B1 | C1 | 4 | — | — | — | — | — | — | — | — | — | — | — | × |
| 23 A39 | | B1 | C1 | 4 | — | — | — | — | — | — | — | — | — | — | — | × |
| 24 A40 | | B1 | C1 | 4 | 195 | 0.1 or more and 1 or less | 7.7.E+05 | 1.1.E+07 | ○ | ○ | ○ | ○ | 100 | ○ | × | ○ |
| 25 A41 | | B1 | C1 | 4 | 230 | 0.1 or more and 1 or less | 9.2.E+04 | 1.9.E+07 | ○ | ○ | ○ | ○ | 85 | × | ○ | ○ |

TABLE 8

| Manufacturing Step | | Core Alloy No. | Sacrificial Anode Material | Brazing Material Alloy No. | Manufacturing Process No. | Tensile Strength After Brazing | Compound Grain Size in Sacrificial Anode Material (μm) | Fatigue Strength | | | Internal Surface Corrosion Resistance | | External Surface Corrosion Resistance | Fin Bonding Ratio | | | Formability of Test Piece |
|---|---|---|---|---|---|---|---|---|---|---|---|---|---|---|---|---|---|
| | | | | | | | | In Sacrificial Anode Material | Number of Times Until Fracture | Evaluation | Acidic | Alkaline | | Bonding Ratio (%) | Evaluation | Erosion | |
| Example | 66 | A1 | B1 | C1 | 4 | 180 | 0.1 or more and 1 or less | 7.9.E+05 | 4.7.E+06 | ○ | ○ | ○ | ○ | 100 | ○ | ○ | ○ |
| | 67 | A1 | B1 | C1 | 7 | 184 | 0.1 or more and 1 or less | 1.8.E+05 | 4.6.E+06 | ○ | ○ | ○ | ○ | 100 | ○ | ○ | ○ |
| | 68 | A1 | B1 | C1 | 8 | 175 | 0.1 or more and 1 or less | 6.0.E+05 | 8.6.E+06 | ○ | ○ | ○ | ○ | 100 | ○ | ○ | ○ |
| | 69 | A1 | B1 | C1 | 9 | 184 | 0.1 or more and 1 or less | 5.9.E+05 | 1.0.E+07 | ○ | ○ | ○ | ○ | 100 | ○ | ○ | ○ |
| | 70 | A1 | B1 | C1 | 10 | 181 | 0.1 or more and 1 or less | 2.4.E+05 | 7.6.E+06 | ○ | ○ | ○ | ○ | 100 | ○ | ○ | ○ |
| | 71 | A1 | B1 | C1 | 13 | 178 | 0.1 or more and 1 or less | 7.7.E+05 | 6.4.E+06 | ○ | ○ | ○ | ○ | 100 | ○ | ○ | ○ |
| | 72 | A1 | B1 | C1 | 14 | 178 | 0.1 or more and 1 or less | 9.2.E+04 | 1.1.E+07 | ○ | ○ | ○ | ○ | 100 | ○ | ○ | ○ |
| | 73 | A1 | B1 | C1 | 15 | 185 | 0.1 or more and 1 or less | 4.4.E+05 | 4.9.E+06 | ○ | ○ | ○ | ○ | 100 | ○ | ○ | ○ |
| | 74 | A1 | B1 | C1 | 16 | 184 | 0.1 or more and 1 or less | 6.1.E+05 | 8.5.E+06 | ○ | ○ | ○ | ○ | 100 | ○ | ○ | ○ |
| Comparative Example | 26 | A1 | B1 | C1 | 5 | 179 | — | — | — | — | — | — | — | — | — | — | — |
| | 27 | A1 | B1 | C1 | 6 | 178 | 0.1 to 3 | 3.8.E+02 | 2.8.E+02 | × | ○ | × | ○ | 100 | ○ | ○ | × |
| | 28 | A1 | B1 | C1 | 11 | 176 | 0.1 or more and 1 or less | 3.7.E+02 | 4.1.E+06 | ○ | ○ | × | ○ | 100 | ○ | ○ | ○ |
| | 29 | A1 | B1 | C1 | 12 | 181 | 0.1 or more and 1 or less | 4.9.E+06 | 6.2.E+06 | ○ | ○ | × | ○ | 100 | ○ | ○ | ○ |

Examples 1 to 74 satisfied the conditions provided in the present invention, and passed or exhibited a good result in each of items of the strength after brazing, the fatigue strength after brazing, the internal surface corrosion resistance (under acidic environment and alkaline environment), the external surface corrosion resistance, the fin bonding ratio, and erosion resistance.

By contrast, in Comparative Example 1, because the Si content of the brazing material was too small, some fins were not bonded, and Comparative Example 1 failed in brazability.

In Comparative Example 2, because the Si content of the brazing material was too large, erosion of the core material occurred, and Comparative Example 2 failed in the test.

In Comparative Example 3, because the Zn content of the brazing material was too large, the self corrosion speed of the brazing material increased, and Comparative Example 3 failed in external surface corrosion resistance.

In Comparative Example 4, because the Si content of the sacrificial anode material was too small, the total number density of single phase pure Si and the Si-including intermetallic compound was small, and Comparative Example 4 failed in internal surface corrosion resistance in alkaline environment.

In Comparative Example 5, because the Si content of the sacrificial anode material was too large, the melting point of the sacrificial anode material decreased, erosion occurred after brazing heating, and Comparative Example 5 failed in the test.

In Comparative Example 6, because the Zn content of the sacrificial anode material was too small, no sacrificial corrosion resistance effect was produced, and Comparative Example 6 failed in internal surface corrosion resistance.

In Comparative Example 7, because the Zn content of the sacrificial anode material was too large, the self corrosion speed thereof increased, and Comparative Example 7 failed in internal surface corrosion resistance.

In Comparative Example 8, because the Cr content of the sacrificial anode material was too large, a coarse compound was generated in casting to damage rolling processability, and no sound sheet material was produced.

In Comparative Example 9, because the Zr content of the sacrificial anode material was too large, a coarse compound was generated in casting to damage rolling processability, and no sound sheet material was produced.

In Comparative Example 10, because the Ti content of the sacrificial anode material was too large, a coarse compound was generated in casting to damage rolling processability, and no sound sheet material was produced.

In Comparative Example 11, because the V content of the sacrificial anode material was too large, a coarse compound was generated in casting to damage rolling processability, and no sound sheet material was produced.

In Comparative Example 12, because the Fe content of the sacrificial anode material was too large, the compound density exceeded the predetermined quantity, and Comparative Example 12 failed in internal surface corrosion resistance in alkaline environment.

In Comparative Example 13, because the Mg content of the sacrificial anode material was too large, the compound density exceeded the predetermined quantity, and Comparative Example 13 failed in internal surface corrosion resistance in alkaline environment.

In Comparative Example 14, because the Si content of the core material was too small, the precipitation quantity of an Al—Mn—Si based compound was small, the strength decreased, and Comparative Example 14 failed in strength after brazing.

In Comparative Example 15, because the Si content of the core material was too large, the melting point decreased, erosion occurred after brazing heating, and Comparative Example 15 failed in the test.

In Comparative Example 16, because the Cu content of the core material was too small, strength after brazing was small, and Comparative Example 16 failed in the test. In addition, because the potential difference from the sacrificial anode material was insufficient, Comparative Example 16 failed in internal surface corrosion resistance.

In Comparative Example 17, because the Cu content of the core material was too large, the melting point decreased, erosion occurred after brazing heating, and Comparative Example 17 failed in the test.

In Comparative Example 18, because the Mn content of the core material was too small, strength after brazing was small, and Comparative Example 18 failed in the test. In addition, because the potential difference from the sacrificial anode material was insufficient, Comparative Example 18 failed in internal surface corrosion resistance.

In Comparative Example 19, because the Mn content of the core material was too large, a coarse compound was generated in casting to damage rolling processability, and no sound sheet material was produced.

In Comparative Example 20, because the Cr content of the core material was too large, a coarse compound was generated in casting to damage rolling processability, and no sound sheet material was produced.

In Comparative Example 21, because the Zr content of the core material was too large, a coarse compound was generated in casting to damage rolling processability, and no sound sheet material was produced.

In Comparative Example 22, because the Ti content of the core material was too large, a coarse compound was generated in casting to damage rolling processability, and no sound sheet material was produced.

In Comparative Example 23, because the V content of the core material was too large, a coarse compound was generated in casting to damage rolling processability, and no sound sheet material was produced.

In Comparative Example 24, because the Fe content of the core material was too large, grains after brazing became fine to cause erosion, and Comparative Example 24 failed in the test.

In Comparative Example 25, because the Mg content of the core material was too large, Mg was diffused to the surface of the brazing material in brazing, consequently some fins were not bonded, and Comparative Example 25 failed in brazability.

In Comparative Example 26, because the start temperature of hot rolling of the sacrificial anode material was too low, deformation resistance in hot rolling was large, difficulty occurred in performing hot rolling and no sound sheet material was produced.

In Comparative Example 27, because the start temperature of hot rolling of the sacrificial anode material was too high, the grain size of single phase pure Si and the Si-including intermetallic compound in the sacrificial anode material was coarsened to 1 μm or more, Comparative Example 27 failed in fatigue strength. In addition, because the total number density of single phase pure Si and the Si-including intermetallic compound was small, Comparative Example 27 failed in internal surface corrosion resistance in alkaline environment.

In Comparative Example 28, because the reduction of hot rolling of the sacrificial anode material was too low, precipitation is difficult to occur, the total number density of single phase pure Si and the Si-including intermetallic compound decreased, and Comparative Example 28 failed in internal surface corrosion resistance in alkaline environment.

In Comparative Example 29, because the reduction of hot rolling of the sacrificial anode material was too high, precipitation excessively occurred, the total number density of single phase pure Si and the Si-including intermetallic compound increased, and corrosion speed under alkaline environment increased, and Comparative Example 29 failed in internal surface corrosion resistance in alkaline environment.

In Comparative Example 30, because the final annealing temperature of the clad material was too low, the gain size of the core material became fine alter brazing heating, erosion occurred in the core material, and Comparative Example 30 failed in the test.

In Comparative Example 31, because the final annealing temperature of the clad material was too high, the grain size of single phase pure Si and the Si-including intermetallic compound in the sacrificial anode material was coarsened to 1 μm or more, Comparative Example 31 failed in fatigue strength. In addition, because the total number density of single phase pure Si and the Si-including intermetallic compound was small, Comparative Example 31 failed in internal surface corrosion resistance in alkaline environment.

The invention claimed is:

1. A three-layered aluminum alloy brazing sheet comprising: a core material made of an aluminum alloy including 0.3 mass % to 1.2 mass % of Si, 0.1 mass % to 1.5 mass % of Cu, and 0.3 mass % to 2.0 mass % of Mn, with the balance being Al and unavoidable impurities; a brazing material cladded onto one side surface of the core material, and made of an aluminum alloy including 4.0 mass % to 13 mass % of Si, with the balance being Al and unavoidable impurities; and a sacrificial anode material cladded onto the other side surface of the core material, and made of an aluminum alloy consisting essentially of 1.0 mass % to 8.0 mass % of Zn and 0.5 mass % to 1.5 mass % of Si, with the balance being Al and unavoidable impurities, wherein
a total number density of single phase pure Si and a Si-including intermetallic compound, existing in the sacrificial anode material and having a grain size of 0.1 μm or more and 1.0 μm or less is $1 \times 10^3/mm^2$ or more and $1 \times 10^6/mm^2$ or less.

2. The three-layered aluminum alloy brazing sheet according to claim 1, wherein the brazing material further includes 5.0 mass % or less of Zn.

3. The three-layered aluminum alloy brazing sheet according to claim 1, wherein the core material further includes at least one or more of 0.01 mass % to 0.3 mass % of Cr, 0.01 mass % to 0.3 mass % of Zr, 0.01 mass % to 0.3 mass % of Ti, and 0.01 mass % to 0.3 mass % of V.

4. The three-layered aluminum alloy brazing sheet according to claim 1, wherein the core material further includes one or two of 0.05 mass % to 1.0 mass % of Fe and 0.1 mass % to 1.0 mass % of Mg.

5. The three-layered aluminum alloy brazing sheet according to claim 1, wherein the sacrificial anode material further includes at least one or more of 0.01 mass % to 0.3 mass % of Cr, 0.01 mass % to 0.3 mass % of Zr, 0.01 mass % to 0.3 mass % or Ti, and 0.01 mass % to 0.3 mass % of V.

6. The three-layered aluminum alloy brazing sheet according to claim 1, wherein the sacrificial anode material further includes one or two of 0.05 mass % to 0.5 mass % of Fe and 0.1 mass % to 2.5 mass % of Mg.

7. A method for manufacturing the three-layered aluminum alloy brazing sheet according to claim 1, comprising: manufacturing process of an aluminum alloy for a sacrificial anode material before being assembled as a clad material, wherein
in the manufacturing process, a hot rolling temperature is set to 400° C. to 500° C., and reduction of hot rolling is set to 50% to 90.

* * * * *